United States Patent [19]

Wurzell

[11] Patent Number: 5,123,707
[45] Date of Patent: Jun. 23, 1992

[54] INFANT SEAT DIVIDER

[76] Inventor: Colleen C. Wurzell, 9321 Cape Cod Dr., Huntington Beach, Calif. 92646

[21] Appl. No.: 537,351

[22] Filed: Jun. 13, 1990

[51] Int. Cl.$^5$ ............................................. A47C 21/00
[52] U.S. Cl. ................................... 297/464; 297/414; 297/463; 5/512
[58] Field of Search ............... 297/253, 414, 218, 227; 273/241, 260; 108/44, 60; 5/512, 513, 433

[56] References Cited

U.S. PATENT DOCUMENTS

| | | | |
|---|---|---|---|
| 1,875,522 | 9/1932 | Sweet | 5/513 |
| 1,979,520 | 11/1934 | Abrams et al. | 5/513 |
| 2,418,092 | 3/1947 | Passel | 297/227 |
| 2,505,687 | 4/1950 | Murphy et al. | 297/217 |
| 2,524,909 | 10/1950 | Hines | 297/414 |
| 2,555,905 | 6/1951 | Pierre | 5/513 |
| 2,692,638 | 10/1954 | Castell | 108/44 |
| 2,937,695 | 5/1960 | Coggin | 297/227 |
| 3,674,272 | 7/1972 | Wszalek | 273/241 |
| 3,926,437 | 10/1975 | Moe et al. | 273/260 |
| 4,015,778 | 4/1977 | Chen et al. | 273/136 |
| 4,118,812 | 10/1978 | Pangburn | 5/433 |
| 4,195,879 | 4/1980 | Miller . | |
| 4,205,850 | 6/1980 | Craig | 273/241 |
| 4,233,699 | 11/1980 | Amato | 5/513 |
| 4,583,779 | 4/1986 | Myers . | |
| 4,668,011 | 5/1987 | Fister, Jr. | 297/218 |
| 4,784,433 | 11/1988 | Purnell-Ayres . | |
| 4,826,245 | 5/1989 | Entratter . | |
| 4,854,638 | 8/1989 | Marcus et al. . | |
| 4,890,346 | 1/1990 | Rist | 5/512 |

FOREIGN PATENT DOCUMENTS 724895  2/1955  United Kingdom ................ 297/414

OTHER PUBLICATIONS

Dec. 1987, Small World Magazine, p. 61.

Primary Examiner—James R. Brittain
Assistant Examiner—Cassandra Hope

[57] ABSTRACT

A seat divider is disclosed for forming a physical barrier between adjacent children on a car seat. The seat divider includes a planar element which is attached to a conventional car seat and extends vertically upwardly therefrom. Formed on the planar element are entertainment indicia so that the planar element serves as an entertainment center for children in addition to serving as a physical barrier.

4 Claims, 1 Drawing Sheet

U.S. Patent      June 23, 1992      5,123,707
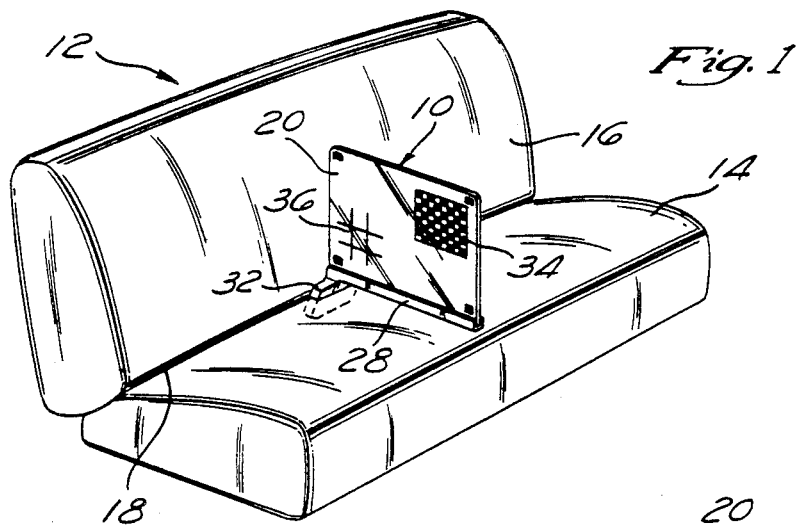
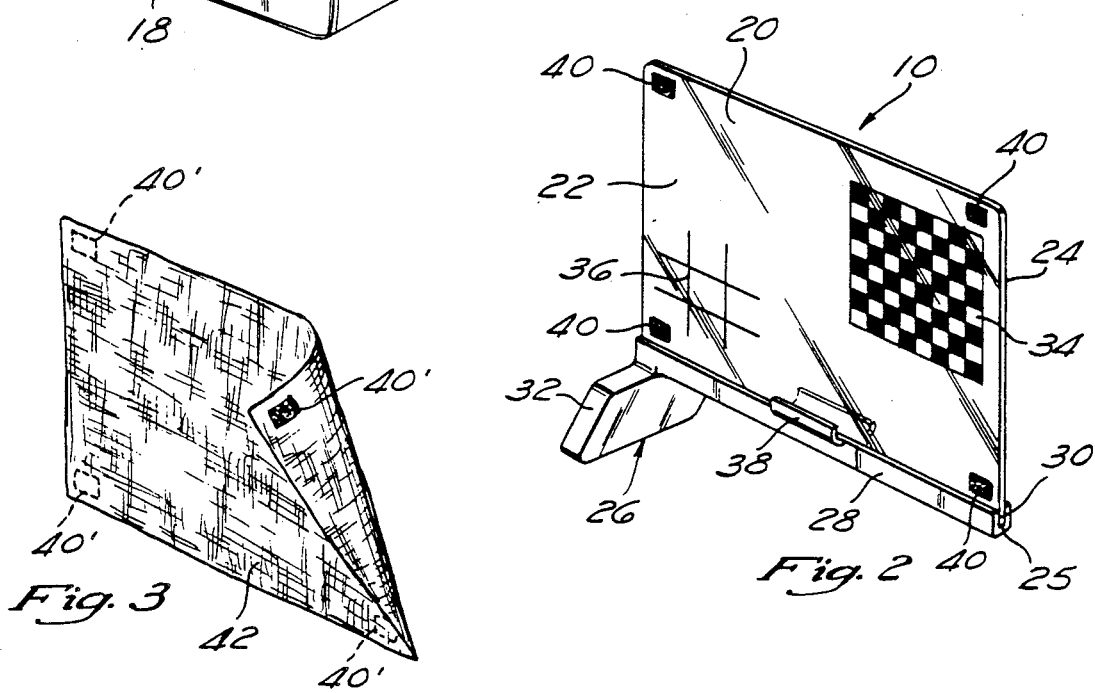
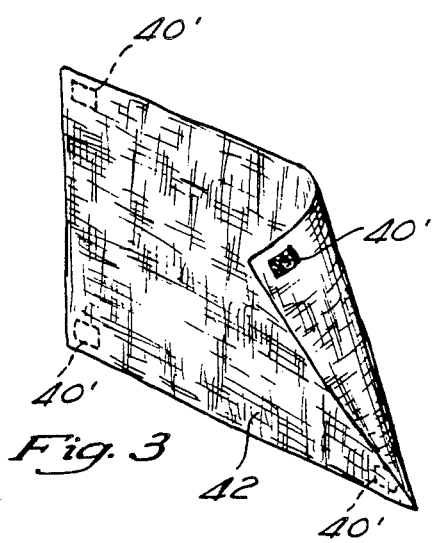
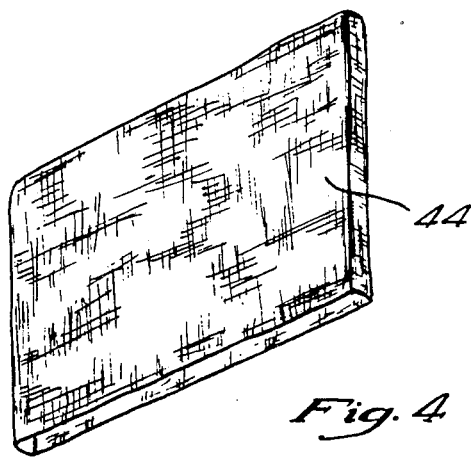

INFANT SEAT DIVIDER

FIELD OF THE INVENTION

The present invention relates generally to vehicular seat attachments, and more particularly to a seat divider for automobiles or the like which forms a physical barrier between adjacent occupants of the seat.

BACKGROUND OF THE INVENTION

As is well known, when young children sit next to one another in the back seat of an automobile, there is a high propensity that in a relatively short period of time they will start arguing or fighting. Particularly, such arguments or fighting pertains to comments such as "he touched me" and "she hit me" and "she's looking at me" or the like. As can be appreciated, a dangerous situation is created when such arguments cause the driver of the automobile to take his or her eyes off the roadway in an attempt to remedy the situation. Moreover, in severer instances such arguments force the driver of the automobile to pull off the side of the road which additionally creates both an inconvenient and unsafe situation. Thus, in considering the current levels of automobile usage in today's society, there is a need for a device which reduces the propensity of adjacent occupants on a car seat, particularly small children, from arguing or fighting while being driven in the automobile.

SUMMARY OF THE INVENTION

In accordance with the preferred embodiment of the present invention, there is provided a seat divider which is attachable to a conventional car seat and extends vertically upwardly therefrom so as to form a physical barrier between adjacent children on the seat. The device generally comprises a planar element defining a first and second planar surface, and an upper and lower edge. The lower edge of the planar element is disposed within an elongated member having a tongue-like member attached to one end thereof. Importantly, the tongue-like member is sized and positioned on the elongated member so as to be received within the seam or region formed by the intersection of the bottom surface of the seat and the backrest portion of the seat.

The planar element may be formed of an opaque or alternatively, a transparent material. Additionally, the planar element may include a drawing surface, tic-tac-toe board, checkerboard or other game-like indicia on the planar surfaces thereof, so that it may serve as an entertainment center for the children in addition to being used as a physical barrier. For transparent planar elements, it is contemplated that a cover be provided. In one embodiment, the cover comprises a shroud sized and configured to be placed over the entire planar element. In another embodiment, single sheets are attached to either or both of the first and second planar surfaces defined by the planar element by means of hook and loop fasteners.

It is an object of the present invention to provide a seat divider which is capable of being installed on the seat of an automobile to act as a physical barrier between adjacent children.

Another object of the present invention is to provide a seat divider which includes indicia formed thereon for providing an entertainment activity for children.

Further objects and advantages of the invention will become apparent to those skilled in the art upon reading and consideration of the following description of a preferred embodiment and the accompanying drawings.

BRIEF DESCRIPTION OF THE DRAWINGS

These as well as other features of the present invention will become more apparent upon reference to the drawings wherein:

FIG. 1 is a perspective view of the seat divider as positioned on and engaged to the car seat of an automobile;

FIG. 2 is a perspective view of the seat divider particularly illustrating the elongated car seat engagement member and entertainment indicia formed on the planar element;

FIG. 3 is a perspective view of a sheet used to cover one or both planar surfaces of the planar element; and FIG. 4 is a perspective view of a shroud which can be used to cover the entire planar element.

DETAILED DESCRIPTION OF THE PREFERRED EMBODIMENT

Referring now to the drawings wherein the showings are for purposes of illustrating a preferred embodiment of the present invention only, and not for the purpose of limiting the same, FIG. 1 shows the seat divider 10 of the present invention as positioned and engaged to the oar seat 12 of an automotive vehicle such as an automobile. Car seat 12 is generally formed of a lower seat portion 14 and an upwardly extending backrest portion 16, wherein the intersection between lower seat portion 14 and backrest portion 16 forms a seam or region 18 therebetween.

Referring now to FIG. 2, seat divider 10 generally comprises a planar element 20 defining a first planar surface 22, a second planar surface 24 and a bottom edge 25. Attaching device 26 is used to secure planar element 20 to car seat 12 such that planar element 20 extends generally vertically upwardly from lower seat portion 14. Attaching device 26 generally comprises an elongated member 28 defining a longitudinally extending, generally U-shaped recess 30 therein. Bottom edge 25 of planar element 20 is disposed within recess 30 and secured therein by an adhesive or similar means. Attached to one end of elongated member 28 is a tongue member 32. Importantly, tongue member 32 is sized and positioned on elongated member 28 such that it may be received and frictionally secured within seam or region 18 of car seat 12. It will be appreciated that in automobiles having bucket seat or seats that do not define a seam, different embodiments of attaching device 26 are contemplated wherein planar element 20 may be utilized in conjunction with such seats.

In the preferred embodiment of the present invention, indicia is formed on first planar surface 22 and second planar surface 24 so as to provide an entertainment activity center for children. Such entertainment indicia may include a checkerboard assembly 34 and a tic-tac-toe board 36, though it will be appreciated that any type of entertainment indicia may be utilized. Additionally, a holder 38 may be provided which extends along a lower portion of first planar surface 22 and second planar surface 24 for holding a coloring pen, crayon, or other means for writing on planar element 20 during an entertainment activity.

In the preferred embodiment of the present invention, planar element 20 is comprised of a generally rectangularly shaped piece of transparent plastic material, though an opaque material may be utilized. Disposed on each of the four corner portions of first planar, surface 22 of the rectangularly shaped planar element 20 are hook and loop fasteners 40. When it is desired to cover the entertainment indicia provided on planar element 20 or to prevent children from looking through planar element 20 when such is constructed from a transparent plastic material, a sheet 42 which is constructed of a flexible, lightweight opaque material is provided, as seen in FIG. 3. Sheet 42 is adapted to be attached to first planar surface 22 by means of hook and loop fasteners 40' positioned thereon and having same dimensional orientation as hook and loop fasteners 40 contained on first planar surface 22. It will be appreciated that hook and loop fasteners 40 may additionally, or alternatively be placed on second planar surface 24 and that a sheet 42 may be attached to either or both first planar surface 22 and second planar surface 24. Moreover, any fastening means may be utilized in conjunction with sheet 42 and planar element 20 which is operable to attach sheet 42 to planar element 20.

Referring now to FIG. 4, an alternative means of covering planar element 20 is shown, wherein a shroud 44 is provided which is operable to concurrently cover both first planar surface 22 and second planar surface 24. As with sheet 42, shroud 44 is constructed from a generally lightweight, flexible opaque material and sized to slidably receive planar element 20.

Additional modifications and improvements of the invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A seat divider positionable upon a seat of an automotive vehicle to form a partition between first and second adjacent occupants thereon, comprising:
   a generally planar element defining a first planar surface, a second planar surface and a lower edge, said planar element being constructed from a generally transparent material and including indicia formed thereon for providing an entertainment activity;
   an elongate member having a first end and a second end, said elongate member defining a longitudinally extending recess therein sized and shaped to receive said lower edge of said planar element such that said planar element extends generally vertically upward from a lower, horizontal surface of said seat in a manner wherein said first planar surface and said second planar surface each face an adjacent occupant on said seat;
   a tongue member attached to said first end of said elongate member, said tongue member being sized and oriented relative said first end so as to be receivable into and frictionally retained within a seam formed within said seat;
   an opaque sheet secured to at least one of said first and said second planar surfaces, said opaque sheet including an attaching means thereon.

2. The device as defined in claim 1 wherein said attaching means comprises hook and loop fasteners.

3. A seat divider positionable upon a seat of an automotive vehicle to form a partition between first and second adjacent occupants thereon, comprising:
   a transparent, generally planar element defining a first planar surface, a second planar surface and a lower edge, said first and second planar surfaces including indicia formed thereon for providing an entertainment activity, said planar element being sized so as to extend a first distance along a vertical surface of said seat and a second distance along a horizontal surface of said seat, said first distance and said second distance being dimensioned to allow said planar element to act as a physical barrier between adjacent occupants on said seat;
   an elongate member having a first end and a second end, said elongate member defining a longitudinally extending recess therein sized and shaped to receive said lower edge of said planar element;
   a tongue member attached to said first end of said elongate member, said tongue member being sized and oriented relative said first end so as to be receivable into and frictionally retained within a seam formed within said seat such that said planar element extends generally vertically upward from said horizontal surface of said seat in a manner wherein said first planar surface and said second planar surface each face an adjacent occupant on said seat; and
   an opaque sheet secured to and sized to completely cover at least one of said first and second planar surfaces, said opaque sheet including an attaching means thereon.

4. The device as defined in claim 3 wherein said attaching means comprises hook and loop fasteners.

* * * * *